United States Patent [19]

Flowers

[11] 4,037,001
[45] July 19, 1977

[54] SALAD DRESSING

[76] Inventor: France Flowers, 157 W. 73rd St., New York, N.Y. 10023

[21] Appl. No.: 677,058

[22] Filed: Apr. 14, 1976

[51] Int. Cl.$^2$ ................................................. A23L 1/24
[52] U.S. Cl. ................................... 426/589; 426/605; 426/655; 426/425
[58] Field of Search ................ 426/589, 605, 655, 425

[56] References Cited
PUBLICATIONS

Lord, Everybody's Cookbook, Henry Holt & Co., New York, 1924, pp. 673, 674.
Berolzheimer, The Sauces, Gravies & Dressings Cookbook, Consolidated Book Pub., Chicago, Ill., 1952, pp. 38, 39.
Berolzheimer, 500 Delicious Salads, Consolidated Book Pub., Chicago, Ill., 1951, pp. 18, 44, 45, 47 & 48.

*Primary Examiner*—Jeanette M. Hunter
*Attorney, Agent, or Firm*—Gottlieb, Rackman & Reisman

[57] ABSTRACT

A salad dressing containing an extract derived from red cabbage is prepared by combining coarsely-divided pieces of red cabbage with a mixture of mayonnaise, vinegar, sugar and salt. After agitation and refrigeration, the liquid portion is withdrawn and used as the salad dressing.

5 Claims, No Drawings

SALAD DRESSING

This invention relates to a novel salad dressing and to a method of preparing the same and, more particularly, concerns a novel salad dressing containing an extract derived from red cabbage.

Salad dressings of various types, which are used to enchance the flavor of vegetable and even fruit salads, are widely commercially available as prepared foods. In addition, some types of salad dressings may be prepared in the home immediately prior to use. For example, a palatable Russian dressing may be made by mixing mayonnaise, catsup, salt and pepper to taste.

Salad dressings are usually emulsified viscous fluid foods prepared from vegetable oil, and acidifying ingredient, an egg-yoke-containing material, and various flavoring agents, such as spices, salt, and sugar. The flavor of such dressings may be varied by changing the amounts of the ingredients, and the resulting preparations are often styled as French, Russian, Blue Cheese, or Thousand Island dressings. For example, French dressing usually contains about thirty-five to seventy percent vegetable oil, about 0.5 to 2.0percent vinegar measured as acetic acid, about 0.15 to 0.75 percent emulsifying agent (usually a vegetable gum), and various flavoring agents.

Although dressings having many different flavors and appearances are available, it has been found that a novel salad dressing with an unusual and unexpectedly desirable flavor is created when some of the above standard ingredients are combined with an extract of red cabbage.

It is therefore an object of the present invention to provide a novel salad dressing having an unusual and desirable flavor.

Another object of the invention is to provide a method of preparing a novel salad dressing which is relatively simple and may be carried out in the home.

Briefly, in accordance with the principles of the present invention, a method for preparing a salad dressing is provided in which red cabbage, which has been cut into coarse pieces, is combined with varying proportions of mayonnaise, sugar, salt and vinegar.

More specifically, the invention embodies a salad dressing which has been prepared by allowing coarsely-divided pieces of raw red cabbage to stand in a semi-solid mixture consisting of mayonnaise and vinegar, as well as sugar and salt, for a specified period of time, after which the liquid portion of the composition is withdrawn and used as a salad dressing.

Other objects and advantages of the present invention will become more readily apparent from the following description and detailed explanation thereof.

In a preferred embodiment, the invention may be used to prepare an edible and tasty liquid food which may be used to as a salad dressing. A head of raw red cabbage, typically weighing approximately 30 ounces, is divided into two portions of approximately equal size, which are then throughly washed and drained. Either portion of the head of cabbage may be used in the preparation of the salad dressing, while the other portion is stored for later use. The cabbage is then cut into pieces approximately 3 inches long by 1 inch wide and, after removal of unusable waste portions, is added to and mixed with a composition which comprises, by volume, about 20 to 45 percent white vinegar (available commercially as Heinz Distilled White Vinegar), about 40 to 50 percent mayonnaise (Hellman's Real Mayonnaise or equivalent), about 10 to 25 percent sugar, and about 0.5 percent salt. Mayonnaise is an emulsified semi-solid food prepared from edible vegetable oil, and acidifying ingredient and an egg-yoke containing material. In a standard form it contains from about 65 to 80 percent vegetable oil, about 0.15 to 0.7 percent vinegar measured as acetic acid and about 4 to 10 percent liquid egg-yoke. Vinegar is an edible food product consisting of a dilute and impure solution of acetic acid, obtained by fermentation from wine, cider, beer, ale, or the like.

After addition of the cabbage pieces, the entire conglomerate mixture is agitated manually with moderate stirring through the use of a standard mixing spoon for approximately seven minutes. Thereafter, it is subjected to refrigeration, preferably at temperatures of about 45° to about 50° F., for one to two hours.

Following the refrigeration period, the solid components of the mixture, including the pieces of red cabbage, are drained. The remaining liquor is the salad dressing of the present invention. Such liquor has a volume of about 2 to 3 cups.

In order to provide a better understanding of this invention, reference will be had to the following specific examples:

EXAMPLE I

A salad dressing was prepared according to the above-described procedure as follows. A head of red cabbage weighing 33 ounces was washed, drained, and split into two portions weighing 15 ounces and 18 ounces, respectively. The portion weighing 18 ounces was shredded into 3 inch by 1 inch pieces. After removal of unusable waste material, the cabbage pieces were mixed with a composition consisting essentially of the following amounts of the various components:

| Ingredient | Amount |
| --- | --- |
| White Vinegar | 1 cup |
| Mayonnaise | 2 cups |
| Sugar | 1 cup |
| Salt | 1 teaspoon |

The above components, together with the cabbage pieces, were stirred moderately for 7 minutes, after which they were refrigerated for 2 hours at 49.5° F.

After refrigeration, the liquid portion of the mixture, having a volume of 2.5 cups, was removed for use as a salad dressing. This composition provided a sweet dressing which was not unlike cherry vanilla ice-cream in flavor, and resembled melted strawberry ice-cream in appearance.

EXAMPLE II

A salad dressing having a different flavor was prepared according to substantially the same procedure as that given in Example I, except that the remaining portion of the head of red cabbage weighing 15 ounces was shredded into 3 inch by 1 inch pieces and the following amounts of the various components were used:

| Ingredient | Amount |
| --- | --- |
| White Vinegar | 1.5 cups |
| Mayonnaise | 1.5 cups |
| Sugar | 0.5 cups |
| Salt | 1 teaspoon |

This composition produced a salad dressing, of a volume of 2.5 cups, the appearance of which was similar to that of Example I, but which exhibited a tart or tangy flavor.

Having thus described the invention, many modifications thereof will be evident to those skilled in the art, without departing from the spirit and scope of the invention as set forth in the appended claims.

What is claimed is:

1. A method of preparing a salad dressing comprising
   a. washing, draining, and shredding a portion of a head of raw red cabbage into coarsely-divided cabbage pieces of substantially equal size,
   b. adding said cabbage pieces to a mixture of salad dressing ingredients comprising white vinegar, mayonnaise, sugar and salt,
   c. agitating said mixture of salad dressing ingredients and cabbage pieces,
   d. refrigerating said mixture of salad dressing ingredients and cabbage pieces, and
   e. removing the liquid portion of said mixture of salad dressing ingredients and cabbage pieces, thereby providing an edible liquid salad dressing.

2. A method of preparing a salad dressing in accordance with claim 1 wherein said cabbage pieces range in size from approximately 1 inch long by 0.5 inches wide to approximately 4 inches long by 2 inches wide.

3. A method of preparing a salad dressing in accordance with claim 2 wherein said mixture of salad dressing ingredients comprises:
   a. 20 to 45 percent white vinegar,
   b. 40 to 50 percent mayonnaise,
   c. 10 to 25 percent sugar, and
   d. 0.5 percent salt.

4. A method of preparing a salad dressing in accordance with claim 3 wherein said mixture of salad dressing ingredients and cabbage pieces is agitated for approximately seven minutes and is refrigerated for approximately one to two hours at a temperature of about 45° to about 50° F.

5. A salad dressing prepared in accordance with the method of claim 1.

* * * * *